United States Patent [19]

Hsiue et al.

[11] Patent Number: 5,656,197

[45] Date of Patent: Aug. 12, 1997

[54] FERROELECTRIC LIQUID CRYSTAL

[75] Inventors: Ging-Ho Hsiue, Hsinchu; Jr-Hong Chen, Taipei Hsien; Rong-Chi Chang, Yulin Hsien, all of Taiwan

[73] Assignee: National Science Council, Taipei, Taiwan

[21] Appl. No.: 384,027

[22] Filed: Feb. 6, 1995

[51] Int. Cl.$^6$ ............ C09K 19/52; C09K 19/20; C08G 77/04
[52] U.S. Cl. ............. 252/299.01; 252/299.67; 528/25; 528/26
[58] Field of Search .......... 252/299.01, 299.66, 252/299.67; 528/32, 25, 26

[56] References Cited

U.S. PATENT DOCUMENTS

| | | | |
|---|---|---|---|
| 5,138,010 | 8/1992 | Keller et al. | 528/26 |
| 5,399,290 | 3/1995 | Haberle et al. | 252/299.01 |
| 5,425,897 | 6/1995 | Morita et al. | 252/299.61 |
| 5,447,655 | 9/1995 | Sato et al. | 252/299.01 |
| 5,563,230 | 10/1996 | Hsu et al. | 528/25 |

FOREIGN PATENT DOCUMENTS 258898  4/1992  European Pat. Off. .

OTHER PUBLICATIONS

Sal, K., et al., *Makromol. Chem. Rapid Commun.*, 9:631–6, (1988).
Suzuki, T., et al., *Makromol. Chem. Rapid Commun.*, 9:755, (1988).
Uchida, S., et al., *Mol. Cryst. Liq. Cryst.*, 155:93–102, (1988).
Adams, et al., *Mol. Cryst. Liq. Cryst.*, 177:145, (1989).
Crivello, J.V., et al., *Chem. of Materials*, 1:445–51, (1989).
Walba, David M., *J. Am. Chem. Soc.*, 111:8273–4 (1989).
Keller, P., et al., *Chem of Materials*, 2:3, (1990).
Destrade, C., *Liq. Cryst.*, 10:4, 457–93, (1991).
Renn, et al., *Mol. Cryst. Liq. Cryst.*, 209:349, (1991).
Rudolf Zenlel, *Adv. Mater* 4 (5), 351, (1992).
J.R.–Hong Chen, et al., *Ferroelectrics*, 147:241–253, (1993).
Hahn, B. et al., *Macromolecules*, 20:2961, (1987).
Klone V., et al., *Liq. Cryst.*, 2:411–22, (1987).
Koppenhoefer, et al., *J. Organic Synthesis*, 66:151, (1987).
Edaleh, S., et al., *Mol. Cryst. Liq. Crys.* 55:47–56, (1988).
Hahn, B., et al., *Mol. Cryst Liq. Cryst. Inc. Ononlin. Opt.*, 157:125–50, (1988).
Hahn, B., et al., *Mol. Cryst. Liq. Cryst.*, 157:1252, (1988).
Keller, P., et al., *Ferroelectrics*, 85:25–34, (1988).
Keller, P., et al., *Mol. Cryst. Liq. Cryst.*, 157:193–202, (1988).
Richard, H., et al., *Mol. Cryst. Liq. Cryst.*, 155:141–50, (1988).
Meyer et al., *J. de Phys. Lett.*, 36:69 (1975).
O. Mitsunobu, *Synthesis*, 1 (1981).
Schivaev, V.P., et al., *Polym. Bull.*, 12:299–301, (1984).
Decobett, G., et al., *Polym. Bull.*, 14:179, (1985).
*Polym. Bull.*, 14:549 (1986).
*Liq. Cryst.*, 1:307, (1986).
*Journal American Chemical Society*, 108:5210, (1986).
Dubois, J.C., et al., *Mol. Cryst. Liq. Cryst.*, 137:349–64, (1986).
*Macromolecules* 20:12, (1987).
Esselin, S., et al., *Liq. Cryst.* 2:505, (1987).
French N., *Liq. Cryst.*, 2:505, (1987).
Hsu et al. Macromol. (1993) vol. 26.
Hsu et al. Macromol. (1992) vol. 25.

*Primary Examiner*—Philip Tucker
*Attorney, Agent, or Firm*—Fish & Richardson P.C.

[57] ABSTRACT

A polymer of the following formula:

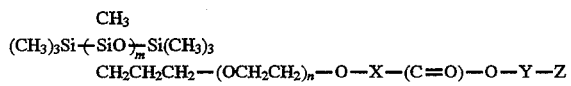

wherein m is an integer from 1 to 100; n is an integer from 0 to 3; each of X and Y, independently, is biphenyl, 1,4-phenylene, or halogen-substituted 1,4-phenylene; and Z is R, —O—(C=O)—R, or —(C=O)—O—R, wherein R is selected from (2R)-2-($C_{4-8}$ alkyl), (1S,2S)-1-halo-2-methyl-1-($C_{3-5}$ alkyl), (2S)-2-methyl-1-($C_{4-7}$ alkyl), (2S)-1-halo-2-methyl-3-propyl, and (2S)-3-halo-2-methyl-1-($C_{4-7}$ alkyl); and a monomer of the following formula:

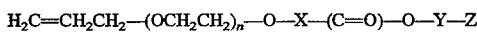

wherein n is an integer from 0 to 3; each of X and Y independently is biphenyl, 1,4-phenylene, or halogen-substituted 1,4-phenylene; and Z is R, —O—(C=O)—R, or —(C=O)—O—R, wherein R is selected from (2R)-2-($C_{4-8}$ alkyl), (1S,2S)-1-halo-2-methyl-1-($C_{3-5}$ alkyl), (2S)-2-methyl-1-($C_{5-7}$ alkyl), (2S)-1-halo-2-methyl-3-propyl, and (2S)-3-halo-2-methyl-1-($C_{4-7}$ alkyl).

10 Claims, No Drawings

FERROELECTRIC LIQUID CRYSTAL

BACKGROUND OF THE INVENTION

Ferroelectric liquid crystals were discovered in 1975 by Meyer et al., *J. de Phys. Lett.*, 36:69 (1975). A ferroelectric liquid crystal-related device can be operated at a reduced driving voltage, if the ferroelectric liquid crystal material spontaneously polarizes and if it exhibits a smectic phase over a wide temperature, preferably including room temperature. Side-chain liquid crystal polymers exhibiting a chiral smectic C mesophase, low molecular weight ferroelectric liquid crystals, and liquid crystal polymers exhibiting ferroelectric properties such as spontaneous polarization have been reported.

SUMMARY OF THE INVENTION

In general, the invention features a ferroelectric liquid crystal polymer of the formula:

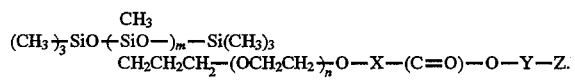

The integer m preferably has a value from 1 to 100. The integer n preferably has a value from 0 to 3. Each of X and Y, independently, is biphenyl, 1,4-phenylene, or halogen-substituted 1,4-phenylene. Z is R, —O—(C=O)—R, or —(C=O)—O—R, wherein R is selected from (2R)-2-($C_{4-8}$ alkyl), (1S,2S)-1-halo-2-methyl-1-($C_{3-5}$ alkyl), (2S)-2-methyl-1-($C_{4-7}$ alkyl), (2S)-1-halo-2-methyl-3-propyl, and (2S)-3-halo-2-methyl-1-($C_{4-7}$ alkyl).

In another aspect, the invention relates to a monomer having the formula:

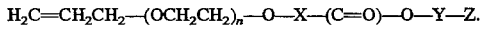

The integer n preferably has a value from 0 to 3. Each of X and Y, independently, is preferably biphenyl, 1,4-phenylene, or halogen-substituted 1,4-phenylene. Z is R, —O—(C=O)—R, or —(C=O)—O—R, wherein R is selected from (2R)-2-($C_{4-8}$ alkyl), (1S,2S)-1-halo-2-methyl-1-($C_{3-5}$ alkyl), (2S)-2-methyl-1-($C_{5-7}$ alkyl), (2S)-1-halo-2-methyl-3-propyl, and (2S)-3-halo-2-methyl-1-($C_{4-7}$ alkyl). These monomers are used to make liquid crystal polymers by reacting them with main chain polymers such as polysiloxane or other main chains known to those skilled in the art. Polymers which include monomers disclosed herein are within the invention.

Thermally and chemically stable, these polymers and monomers have excellent photoelectric properties. Examples of such properties include bistable characteristics which allow a faster response speed in, e.g., a monitor; spontaneous polarization; and smectic phase behavior.

The polymers and monomers disclosed herein are suitable for the production of liquid crystal-containing devices such as: photoelectric control elements, spatial light modulators, electrooptical modulators, optical elements of frequency conversion and parametric processing, liquid crystal display monitors (including dual scan LCD monitors), iconoscopes (such as those in high definition televisions), and photomemory devices, such as erasable optical discs. Other devices include filters (e.g., in the stationary phase of high performance liquid chromatography), reflectors (e.g., to adjust the brightness of car window glass), and linear polariscopes. Other uses for liquid crystals are easily determined by those in the art.

Other features and advantages of the invention will be apparent from the following detailed description and from the claims.

Detailed Description

This invention relates to a liquid crystal polymer, having a polysiloxane main chain, and a multiplicity of chiral side chains. Each side chain is bonded to a Si atom on the main chain. There are, on average, m side chains on each polysiloxane main chain, where m is 1–100, preferably 20–80, and more preferably 40–80. The side chains are the same or different, and are preferably the same.

A side chain includes an alkoxy spacer, a mesogenic or liquid crystal group, and a terminal chiral group R. The alkoxy spacer has n units, where n is 0–10, and preferably 0–3 alkoxy units. Examples of alkoxy units are methoxy, ethoxy, propoxy, and butoxy. The alkoxy spacer is preferably ethoxy. The alkoxy units in the alkoxy spacer are the same or are different, and are preferably the same.

The mesogenic or liquid crystal group contains aromatic and heteroaromatic groups X and Y. X is linked to an alkoxy unit by a linking moiety, such as a covalent bond, —O—, —(C=O)—, —(C=O)—O—, —O—(C=O)—, —NH—, —S—, and —SO$_2$—, and preferably —O—. Preferred examples of X and Y are biphenyl, substituted biphenyl, 1,4-phenylene, and substituted 1,4-phenylene, wherein the substituents are halogen, and preferably are F or Cl. For example, a halogen-substituted 1,4-phenylene has at least one of F, Cl, Br, or I. A substituent may be at the 2, 3, 5, or 6 position. There may be more than one substituent. 1,4-phenylenes substituted with F or Cl are preferred. X and Y may also be monocyclic or bicyclic $C_{3-10}$ heteroaryl groups. X and Y may be the same or different, i.e., X and Y are independently selected. X is also linked to Y by one of the above linking moieties, preferably —O—, —(C=O)—O—, or —O—(C=O)—, and more preferably —(C=O)—O—. For certain applications, it is preferred that at least of one of X and Y is biphenyl; that one of X and Y is biphenyl, e.g., 4,4'-biphenyl, the other being 1,4-phenylene; that X is 1,4-phenylene, and Y is 4,4'-biphenyl; that at least one of X and Y is 1,4-phenylene; or that both X and Y are 1,4-phenylene. An oxyethylene chain is more suitable for formation of mesophases in three aromatic rings of ester system than in two aromatic rings of ester system. In general, three ring systems are preferred, e.g., a 1,4-phenylene and a biphenyl.

Y is linked directly to Z. Z includes a linking moiety selected from the group of linking moieties listed above, and a terminal chiral group R. Z is preferably R, —O—(C=O)—R, or —(C=O)—O—R. R is a straight chain or branched $C_{1-10}$ alkyl or a straight chain or branched haloalkyl group with at least one chiral carbon atom. R is preferably selected from the group consisting of (2R)-2-($C_{4-8}$ alkyl), (1S,2S)-1-halo-2-methyl-1-($C_{3-5}$ alkyl), (2S)-2-methyl-1-($C_{4-7}$ alkyl), (2S)-1-halo-2-methyl-3-propyl, and (2S)-3-halo-2-methyl-1-($C_{4-7}$ alkyl). R may also be enantiomers or diastereomers of the above preferred R moieties. A halo-alkyl has a F, Cl, Br, or I at the designated position. Halo-alkyls substituted with F or Cl are preferred.

R is more preferably (2R)-2-($C_{4-8}$ alkyl), (1S,2S)-1-halo-2-methyl-1-($C_{3-5}$ alkyl), and (2S)-2-methyl-1-($C_{4-7}$ alkyl). Specific preferred examples of R include (2R)-2-octyl, (1S, 2S)-1-chloro-2-methyl-1-butyl, and (2S)-2-methyl-1-butyl.

Embodiments of this aspect of the invention therefore include the following polymers of the above polymer formula (i) wherein each of X and Y, independently, is biphenyl or 1,4-phenylene; and Z is —O—(C=O)—R or —(C=O)—O—R, wherein R is selected from (2R)-2-($C_{4-8}$ alkyl), (1S,2S)-1-halo-2-methyl-1-($C_{3-5}$ alkyl), and (2S)-2-methyl-1-($C_{4-7}$ alkyl); (ii) wherein one of X and Y is biphenyl and the other is 1,4-phenylene; (iii) wherein m is between 40 and 80; (iv) wherein at least of one of X and Y is biphenyl, and Z is —O—(C=O)—R or —(C=O)—O—R, R being (2R)-2-octyl, (1S,2S)-1-chloro-2-methyl-1-butyl, or (2S)-2-methyl-1-butyl; (v) wherein R is (2R)-2-($C_{4-8}$ alkyl), or (1S,2S)-1-halo-2-methyl-1-($C_{3-5}$ alkyl); (vi) wherein R is selected from (2S)-2-methyl-1-($C_{4-7}$ alkyl) and (2S)-3-halo-2-methyl-1-($C_{4-7}$ alkyl); (vii) wherein at least one of X and Y is 1,4-phenylene, or halogen-substituted 1,4-phenylene, or halogen-substituted 1,4-phenylene; or (viii) wherein m is between 20 and 80, or (ix) combinations of the above.

In another aspect, the invention includes a side chain monomer of the following formula:

$$H_2C=CH_2CH_2—(OCH_2CH_2)_n—O—X—(C=O)—O—Y—Z$$

As is apparent from the immediately preceding monomer formula, the general structure of the monomer is analogous to that of the side chain described in the above polymer formula. Preferably, the integer n is 0–10, and more preferably is 0–3. X and Y are as above, and preferably each of X and Y, independently, is biphenyl, 1,4-phenylene, or halogen-substituted 1,4-phenylene. Z is R, —O—(C=O)—R, or —(C=O)—O—R, wherein R is selected from (2R)-2-($C_{4-8}$ alkyl), (1S,2S)-1-halo-2-methyl-1-($C_{3-5}$ alkyl), (2S)-2-methyl-1-($C_{5-7}$ alkyl), (2S)-1-halo-2-methyl-3-propyl, and (2S)-3-halo-2-methyl-1-($C_{4-7}$ alkyl).

Embodiments of the invention include a monomer of the above monomer formula (i) wherein each of X and Y, independently, is biphenyl or 1,4-phenylene; and Z is —O—(C=O)—R or —(C=O)—O—R, wherein R is selected from (2R)-2-($C_{4-8}$ alkyl), (1S,2S)-1-halo-2-methyl-1-($C_{3-5}$ alkyl), and (2S)-2-methyl-1-($C_{5-7}$ alkyl); (ii) wherein one of X and Y is biphenyl, the other being 1,4-biphenylene; (iii) wherein R is (2S)-2-methyl-1-($C_{5-7}$ alkyl); (iv) wherein R is (2R)-2-($C_{4-8}$ alkyl), or (1S,2S)-1-halo-2-methyl-1-($C_{3-5}$ alkyl); or (v) wherein one of X and Y is biphenyl, the other being 1,4-biphenylene; and Z is —O—(C=O)—R or —(C=O)—O—R, R being (2R)-2-octyl, or (1S,2S)-1-chloro-2-methyl-1-butyl, (vi) or combinations of the above. In addition, n may have a range of values or a single value, such as wherein n is 0; wherein n is 1–3; wherein n is 3; and wherein n is 1–2.

Synthesis of Side Chain Monomers

Side chain monomers were prepared according to the general Scheme I below.

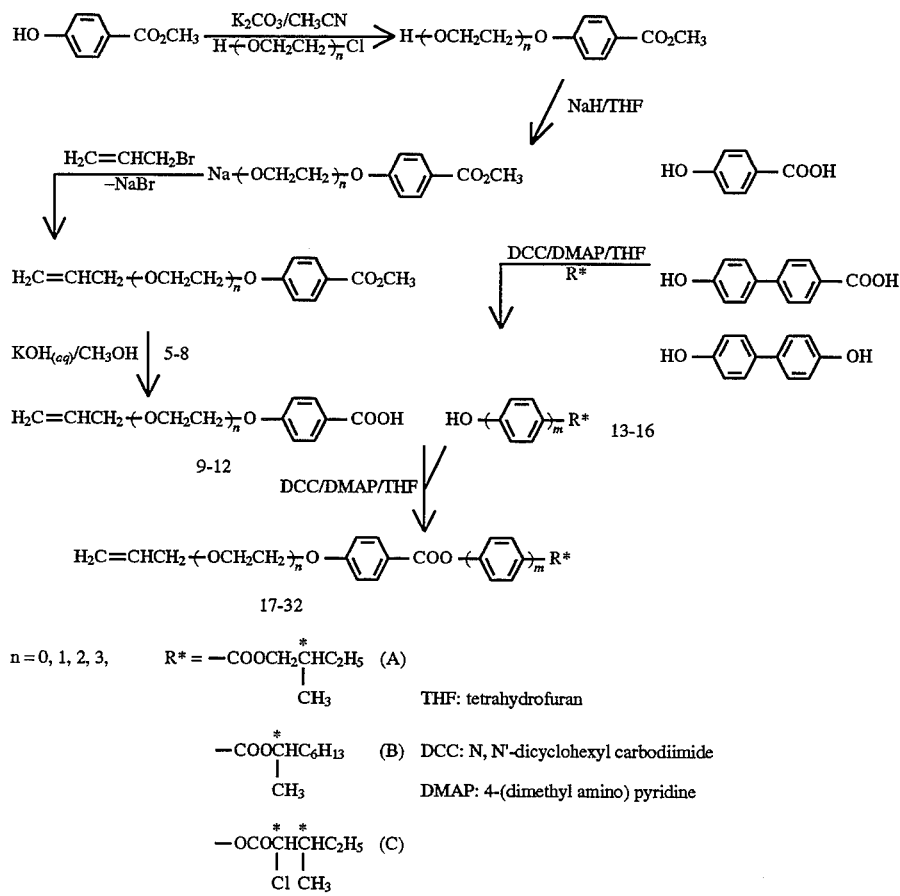

Synthetic details of the above reactions are described in Examples 1–7 below. Other synthetic routes will be apparent those in the art.

The following monomers were synthesized by methods the same or closely analogous to the methods detailed in Examples 1–6. See also, JR-Hong Chen, et al., *Ferroelectrics*, 147:241 (1993). Related monomers are grouped. (A) 4-[(S)-2-methyl-1-butoxycarbonyl]phenyl 4-allyloxybenzoate (17); 4-[(S)-2-methyl-1- butoxycarbonyl]phenyl 4-(2-allyloxyethoxy) benzoate (18); 4-[(S)-2-methyl-1-butoxycarbonyl]phenyl 4-(2-(2-allyloxyethoxy)ethoxy)benzoate (19); and 4-[(S)-2-methyl-1-butoxycarbonyl]phenyl 4-(2-(2-(2-allyloxyethoxy)ethoxy)ethoxy)benzoate (20); (B) 4-[(S)-2-methyl-1-butoxycarbonyl]-4'-biphenyl 4-allyloxy benzoate (21); 4-[(S)-2-methyl-1-butoxycarbonyl]-4'-biphenyl 4-(2-allyloxyethoxy)benzoate (22); 4-[(S)-2-methyl-1-butoxycarbonyl]-4'-biphenyl 4-(2-(2-allyloxyethoxy)ethoxy)benzoate (23); and 4-[(S)-2-methyl-1-butoxycarbonyl]-4'-biphenyl 4-(2-(2-(2-allyloxyethoxy)ethoxy)ethoxy)benzoate (24); (C) 4-[(R)-1-methyl-1-heptoxycarbonyl]-4'-biphenyl 4-allyloxybenzoate (25); 4-[(R)-1-methyl-1-heptoxycarbonyl]-4'-biphenyl 4-(2-allyloxyethoxy)benzoate (26); 4-[(R)-1-methyl-1-heptoxycarbonyl]-4'-biphenyl 4-(2-(2-allyloxyethoxy)ethoxy)benzoate (27); and 4-[(R)-1-methyl-1-heptoxycarbonyl]-4'-biphenyl 4-(2-(2-(2-allyloxyethoxy)ethoxy)ethoxy)benzoate (28); (D) 4-[(2S,3S)-2-chloro-3-methylpentanoyloxy]-4'-biphenyl 4-allyloxybenzoate (29); 4-[(2S,3S)-2-chloro-3-methylpentanoyloxy]-4'-biphenyl 4-(2-allyloxyethoxy)benzoate (30); 4-[(2S,3S)-2-chloro-3-methylpentanoyloxy]-4'-biphenyl 4-(2-(2-allyloxyethoxy)ethoxy)benzoate (31); and 4-[(2S,3S)-2-chloro-3-methylpentanoyloxy]-4'-biphenyl 4-(2-(2-(2-allyloxyethoxy)ethoxy)ethoxy)benzoate (32).

Synthesis of Liquid Crystal Polymers

Liquid crystal polymers were prepared by a graft reaction between a polymethylsiloxane (m=1–100) and a side chain monomer. Polysiloxanes where m is between 20 and 80 are preferred, m being between 40 and 80 even more preferred. A polymethylsiloxane is reacted with a side chain monomer in the approximate proportion of 1:1.15, respectively. The reactant is dissolved in freshly-distilled aromatic organic solvents such as benzene, toluene, and xylene, or other water-free organic solvents such as dichloromethane. The reaction temperature is generally between 60°–150° C.; a reflux column was used as necessary to avoid solvent volatilization. A suitable catalyst, such as platinum divinyltetramethyl disiloxane, is used. The progress of the graft reaction was monitored by FT-IR (disappearance of Si—H absorption at 2180 $cm^{-1}$).

Examples 7 and 8 below are representative methods of making a liquid crystal polymer by a graft reaction. The following polymers were synthesized by methods closely analogous to those detailed in Examples 7 and 8. Poly{methyl[4-[(S)-2-methyl-1-butoxycarbonyl]phenyl 4-allyloxybenzoate]siloxane}; Poly{methyl[4-[(S)-2-methyl-1-butoxycarbonyl]phenyl 4-(2-allyloxyethoxy)benzoate]-siloxane}; Poly{methyl[4-[(S)-2-(methyl-1-butoxycarbonyl]-phenyl 4-(2-(2-allyloxyethoxy)ethoxy)benzoate]siloxane}; Poly{methyl[4-[(S)-2-(methyl-1-butoxycarbonyl]phenyl-4'-biphenyl 4-allyloxybenzoate]siloxane}; Poly{methyl[4-[(S)-2-(methyl-1-butoxycarbonyl]phenyl-4'-biphenyl 4-(2-allyloxyethoxy)benzoate]siloxane}; Poly{methyl[4-[(S)-2-methyl-1-butoxycarbonyl]-4'-biphenyl 4-(2-(2-allyl-oxyethoxy)ethoxy)benzoate]siloxane}; Poly{methyl[4-[(S)-2-methyl-1-butoxycarbonyl]-4'-biphenyl 4-(2-(2-(2-allyloxyethoxy)ethoxy)ethoxy)benzoate]siloxane}; Poly{methyl[4-[(R)-1-methyl-1-heptoxycarbonyl]-4'-biphenyl 4-(2-(2-(2-allyloxyethoxy)ethoxy)ethoxy)benzoate]siloxane}; Poly{methyl[4-[(2S,3S)-2-Chloro-3-methylpentanoyloxy]-4'-biphenyl 4-(2-allyloxybenzoate)siloxane}; Poly{methyl [4-[(2S,3S) -2-Chloro-3-methylpentanoyloxy]-4'-biphenyl 4-(2-allyloxyethoxy)benzoate]siloxane}; Poly{methyl[4-[(2S,3S)-2-Chloro-3-methylpentanoyloxy]-4'-biphenyl 4-(2-(2-allyl-oxyethoxy)ethoxy)benzoate]siloxane}; and Poly{methyl-[4-[(2S,3S)-2-Chloro-3-methylpentanoyloxy]-4'-biphenyl 4-(2-(2-(2-allyloxyethoxy)ethoxy)ethoxy)benzoate]siloxane}. Examples of preferred polymers include those in Scheme II below:

Scheme II

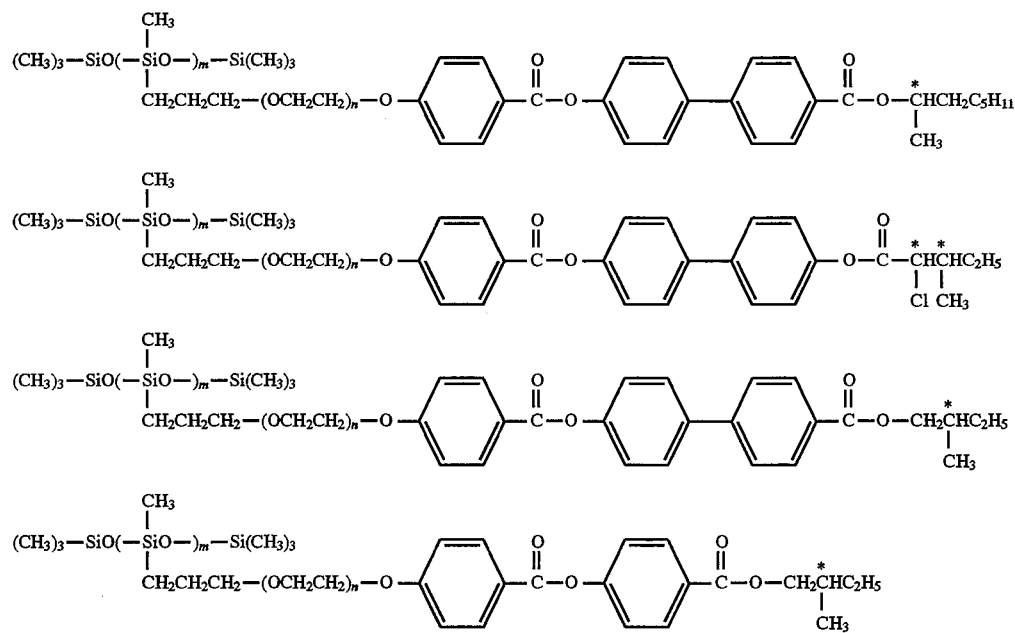

Characterization

Identification or performance characteristics may be determined by methods known to those in the art of liquid crystals or liquid crystal polymers. Such methods include IR, NMR, differential scanning calorimetry, gel permeation chromatography, optical polarizing microscopy, elemental analysis, flash chromatography, and digital polarimetry.

Different terminal chiral groups generally result in different mesomorphic sequences. Phases such as blue phase (BP, BPI, BPII, etc.), smectic A phase ($S_A$), smectic C phase ($S_C$), cholesteric phase (Ch), twist grain boundary phase ($TGB_A$), and chiral smectic C phase ($S_C^*$) are observed by methods such as optical microscopy. A Nikon Microphot-FX optical polarized microscope equipped with a Mettler FP 82 hot stage and a Mettler FP-80 central processor was used in observing thermal transitions and anisotropic textures.

For example, some polymers were enantiotropic, or had an unusal, colorful homeotropic alignment with a chiral smectic C bistability. Some polymers formed a chiral smectic C phase, others formed a chiral smectic C phases with striated lines, and still others formed a novel smectic A phase through distortion of the helix of the $TGB_A$ with a novel spiral fan texture. It was also unusual that a $TGB_A$ phase was present in a homologue having a short spacer chain, since the $TGB_A$ phase is generally present in liquid crystals with long spacer chains.

Where transition temperatures are too low (e.g., $-20°$ to $-40°$ C.) to be determined by optical microscopy, scanning calorimetry was used. Transition enthalpies were determined by differential scanning calorimetry. Melting transition enthalpies and, where minimal overlapping makes it possible, individual transition enthalpies were determined. The transition temperatures and corresponding enthalpies values were plotted.

A Seiko DSC 220C differential scanning calorimeter equipped with a 5200H computer system was used to determine the thermal transitions that were read at the maximum of their endothermic or exothermic peaks. In all cases, heating and cooling rates were $5°$ C. $\min^{-1}$, unless otherwise specified. After the first heating scan, the sample was annealed at $10°$ C. above the isotropization temperature for 5–10 mins. Under these condition, beginning with the second heating and cooling scans, all recorded DSC scans gave reproducible data. The transitions reported were read during the second or third heating scan and cooling scan unless otherwise specified.

For example, four homologues of series MDn12A underwent a larger degree of supercooling (max.: $70.9°$ C. for MD212A) than compounds of the other three series. This property has been utilized effectively in liquid crystal mixtures (Adams et al., *Mol. Cryst. Liq. Cryst.*, 177:145 (1989)).

Racemate studies provide further characterization of liquid crystal polymers. For example, the layered structure of the $TGB_A$ phase was first inferred from studies of racemates of the two compounds: ($\pm$)MD212A and ($\pm$)MD312A. They all exhibited the phase sequence: I—N—$S_A$—Cryst. Smectic A phase was observed instead of $TGB_A$ phase when chirality was eliminated in a racemate. This showed that the $TGB_A$ phase is a variant of the smectic A phase. The temperatures of clarification were higher than those of the optically pure compounds. This result is consistent with the Renn-Lubensky model (Rennet al., *Mol. Cryst. Liq. Cryst.*, 209:349 (1991)) and the prediction of de Gennes, *Solid St. Commun.*, 10:753 (1972).

The invention is further described by the following synthetic examples.

EXAMPLES

Allyl bromide, 2-chloroethanol, 2-(2-chloroethoxy) ethanol, 2-(2-(2-chloroethoxy)ethyoxy)ethanol, 4-hydroxy-4'-biphenylcarboxylic acid (from Aldrich); methyl 4-hydroxy benzoate, 4-hydroxybenzoic acid, 4,4'-dihydroxybiphenyl (TCI); (S)-2-methyl-1-butanol (from Fluka); L-2-octanol (Janssen); L-isoleucine and other reagents (Merck) were used as received. $^1$H-NMR spectra were obtained with a Bruker AM300 MHz spectrometer. All spectra were recorded in $CDCl_3$ with TMS as the internal standard unless otherwise noted.

EXAMPLE 1

(2S,3S)-2-chloro-3-methyl-pentanoic acid (1)

The synthesis of compound (1) is according to the method of Koppenhoefer et al., *J. Organic synthesis*, 66:151 (1987). In a 500 ml, round flask equipped with a magnetic stirrer were placed L-isoleucine (0.2 mole) and 360 ml 5N HCl at $0°$ C. The cooled sodium nitrite aqueous solution (0.3 mole) was added dropwise under nitrogen below $4°$ C. After stirring the reaction mixture for 5 hours, removed the ice bath and kept at room temperature for 24 hours. 16 grams calcium carbonate was added, and extracted with ethyl ether. The organic phase was washed with a 10 wt. % aqueous solution of HCl, and the solvent was evaporated on a rotavapor. The colorless oily product was obtained by vacuum distillation ($110°$ C./8 mm Hg, Yield 84,7%) $[\alpha]^{25}_d = -7.6$, $^1$H-NMR ($CDCl_3$, TMS): d=0.0 (t, 3H, —$CH_2CH_3$), 0.97 (d, 3H, —$CHCH_3$—$C_2H_5$), 1.27 and 1.58 (m, 2H, —$CH_2CH_3$), 2.03 (m, 1H, —$CHCH_3$), 4.14 (m, 1H, —CHCl—COOH).

EXAMPLE 2

Methyl 4-(2-hydroxyethoxy)benzoate (2)

Methyl 4-(2-(2-hydroxyethoxy)ethoxy)benzoate (3)

Methyl 4-(2-(2-(2-hydroxyethoxy)ethoxy)ethoxy) benzoate (4)

These compounds were synthesized by a similar method. The representative synthesis of 4-(2-(2-hydroxyethoxy) ethoxy)benzoate (3) is presented. A solution of 2-(2-chloro ethoxy)ethanol 5.338 grams (0.04 mole) in 50 ml of acetonitrile was added dropwise to a solution of methyl 4-hydroxybenzoate 5.1 grams (0.036 mole) and 23.2 grams (0.168 mole) of powdered anhydrous potassium carbonate in 300 ml of acetonitrile at $80°$ C. After stirring the reaction mixture under reflux for 12 hours, 250 ml of the acetonitrile was then distilled and 250 ml dichloromethane was added. The reaction mixture was filtered through CELITE® and the solid was washed thoroughly with dichloromethane. Evaporation of the filtrate yielded product in the form of a yellow oil. Purification by flash chromatography on silica gel with 40% diethyl ether in dichloromethane yielded 7.1 g (87%). $^1$H-NMR ($CDCl_3$, TMS): d=2.62 (s, 1H, —OH), 3.81–4.25 (m, 8H, —($OCH_2CH_2$)$_2$—), 3.85 (s, 3H, —$COOCH_3$), 6.9 and 7.9 (2d, 4 aromatic protons).

EXAMPLE 3

Methyl 4-allyloxybenzoate (5)

Methyl 4-(2-allyloxyethoxy)benzoate (6)

Methyl 4-(2-(2-allyloxyethoxy)ethoxy)benzoate (7)

Methyl 4-(2-(2-(2-allyloxyethoxy)ethoxy)ethoxy) benzoate (8)

These compounds were synthesized by similar methods. The representative synthesis of methyl 4-(2-(2-allyloxyethoxy)ethoxy)benzoate (7) is presented. The obtained methyl 4-(2-(2-hydroxyethoxy) ethoxy) benzoate (3) 8.4 grams (0.035 mole) was added to a suspension of 3.15 grams (0.105 mole) sodium hydride in 100 ml dried tetrahydrofuran at 4° C. After the hydrogen was completely released, allyl bromide 3.94 ml (0.0456 mole) was added dropwise to the reaction mixture and then stirred at room temperature overnight. The excess sodium hydride was treated with distilled water and extracted with ethyl acetate. The organic phase was washed with 10% aqueous hydrochloric acid solution, dried over anhydrous $MgSO_4$, and the solvent evaporated on a rotary evaporator. The yellow oil product was purified by flash chromatography on silica gel with 4% diethyl ether in dischloromethane. Yield 8.39 grams (86%). $^1$H-NMR ($CDCl_3$, TMS): d=3.81–4.25 (m, 10H, —$CH_2$— ($OCH_2CH_2)_2$—), 3.85 (s, 3H, —$COOCH_3$), 5.23 and 5.9 (m, 3H, CH=CH—), 6.95 and 8.05 (2d, 4 aromatic protons).

EXAMPLE 4

4-allyloxybenzoic acid (9)

4-(2-allyloxyethoxy)benzoic acid (10)

4-(2-(2-allyloxyethoxy)ehtoxy)benzoic acid (11)

4-(2-(2-(2-allyloxyethoxy)ethoxy)ethoxy)benzoic acid (12)

These compounds were synthesized by similar methods. The representative synthesis of 4-(2-(2-allyloxyethoxy) ethoxy)benzoic acid (11) is presented. A mixture of 8.39 grams (0.03 mole) of the obtained methyl 4-(2-(2-allyloxyethoxy)ethoxy)benzoate (7), 6 ml of 50% aqueous sodium hydroxide solution and 150 ml of methanol was stirred under reflux for three hours. Methanol was distilled off (100 ml) and water 600 ml was added. The reaction mixture was acidified with hydrochloric acid. After cooling to 0° C., a white solid was filtered and set aside. The filtrate was extracted with dichloromethane and the extracted material was evaporated to a white solid which was combined with the set-aside material. The combined material was dried under vacuum to yield 4.4 g of product (94.3%). $^1$H-NMR ($CDCl_3$, TMS): d=3.81–4.25 (m, 10H, —$CH_2$— ($OCH_2CH_2)_2$— ), 5.23 and 5.9 (m, 3H, $CH_2$=CH—), 6.95 and 8.05 (2d, 4 aromatic protons), 12.2 (s, 1H, —COOH).

EXAMPLE 5

(S)-2-methyl-1-butyl 4-hydroxybenzoate (13)

4-4'-biphenyl (2S,3S)-2-chloro-3-methyl pentanoate (16)

The two compounds were prepared esterification of 4-hydroxybenzoic acid and (S)-2-methyl-1-butanol, and (2S,3S)-2-chloro-3-methyl pentanoic acid (1) and 4-4'-dihydroxybiphenyl by esterification. An example of compound (13): In a 250 ml round flask, 4-hydroxybenzoic acid 4.14 grams (0.03 mole), (S)-2-methyl-1-butanol 4.3 ml (0.04 mole), DCC (Dicyclohexylcarbondiimide) 6.18 grams (0.03 mole), 4-pyrrolidino pyridine 0.444 grams (0.003 mole) and dried THF 50 ml were stirred under $N_2$ at 4° C. overnight. The solution was filtered and filtrate was washed by 10% HCl(aq) and 5% $NaHCO_{3(aq)}$. And then the filtrate was evaporated to a crudely yellow oil. The product was purified by reduced pressure distillation (140° C./0.9 mm-Hg). Yield (13) 70.5%, (16) 79.36%. m.p.: (13)<25° C., (16) 121° C. $^1$H-NMR ($CDCl_3$, TMS): (13.) 1.0 (m, 6H, —$CHCH_3$—$CH_2CH_3$), 1.3 and 1.5 (m, 2H, —$CH_2CH_3$), 1.8 (m, 1H, —$CHCH_3$), 4.2 and 4.3 (m, 2H, —O—$CH_2$—), 7.0 and 8.0 (2d, 4H, aromatic protons). (16) 0.9 (t, 3H, —$CH_2CH_3$) 0.97 (d, 3H, —$CHCH_3$—$C_2H_5$), 1.27 and 1.58 (m, 2H, —$CH_2CH_3$), 2.03 (m, 1H, —$CHCH_3$), 4.14 (m, 1H, —CHCl—COO), 6.9, 7.5, 7.6 and 9.05 (4d, 8H, aromatic protons).

EXAMPLE 6

(S)-2-methyl-1-butyl 4-hydroxybiphenyl-4'-carboxylate (14)

(R)-1-methyl-1-heptyl 4-hydroxybiphenyl-4'-carboxylate (15)

A Mitsunobu reaction was used to prepare compounds (14) and (15). See O. Mitsunobu, Synthesis, 1 (1981). The representative synthesis of compound (14) was as follows. A solution of (S)-2-methyl-1-butanol 1.505 ml (0.014 mole) and TPP (triphenylphosphine) 2.447 grams (0.009 mole) in 20 ml of dried THF was added dropwise to a solution of 4-hydroxybiphenyl-4'-carboxylic acid 2 grams (0.009 mole) and 23.2 grams (0.168 mole) of DEAD (diethyl azodicarboxylate) 1.625 grams (0.009 mole) in 20 ml of dried THF at room temperature. After stirring the reaction mixture under reflux for 24 hours, the reaction mixture was filtered through celite. Evaporation of the filtrate yielded product in the form of a yellow oil. Purification by flash chromatography on silica gel with 40% diethyl ether in dichloromethane yielded 2.2 g (80%). m.p.:(140 104° C., (15) 111.8° C. $^1$H-NMR ($CDCl_3$, TMS): (14) 1.0 (m, 6H, —$CHCH_3$—$CH_2CH_3$), 1.3 and 1.5 (m, 2H, —$CH_2CH_3$), 1.8 (m, 1H, —$CHCH_3$), 4.2 and 4.3 (m, 2H, —O—$CH_2$__, 6.9, 7.5, 7.6 and 8.05 (4d, 8H, aromatic protons). (15) 0.9 (t, 3H, —$(CH_2)_4$—$CH_3$), 1.34, d, 3H, —$OCHCH_3$—), 1.26–2.28 (m, 10H, —$CH_2)_5$—$CH_3$), 4,44 (m, 1H, —O—$CHCH_3$—$CH_2$—), 6.9, 7.5, 7.6 ad 8.05 (4d, 8H, aromatic protons).

EXAMPLE 7

Polymethylsiloxane (Mn=2270, Petrarch System Co.) and 1.15 mole equivalents of 4-[(S)-2-methyl-1-butoxycarbonyl]phenyl 4-allyloxybenzoate were dissolved in toluene. Approximately 0.01 mole equivalents (relative to the monomer) was added to the solution. The reaction was stirred at about 110° C. until complete. After removing the toluene, the concentrated product was dissolved in approximately 50 volumes of methanol. The precipitate was filtered and dried.

EXAMPLE 8

0.8133 grams (1.4 mmol) of 4-[(S)-2-methyl-1-butoxy carbonyl]-phenyl 4-(2-(2-(2-allyloxyethoxy)ethoxy)ethoxy) benzoate and 0.06 grams (1 mmol) of polymethylsiloxane (Petrarch Systems 120, m=40, Mn=2200–2400 ) were reacted as above.

Other Embodiments

Publications disclosed herein are hereby incorporated by reference. From the foregoing description, one skilled in the art can easily ascertain the essential characteristics of this invention, and without departing from the spirit and scope thereof, can make modifications of the invention to adapt it to various usages. Thus, other embodiments are within the following claims.

What is claimed is:

1. A polymer having one of the following formulae:

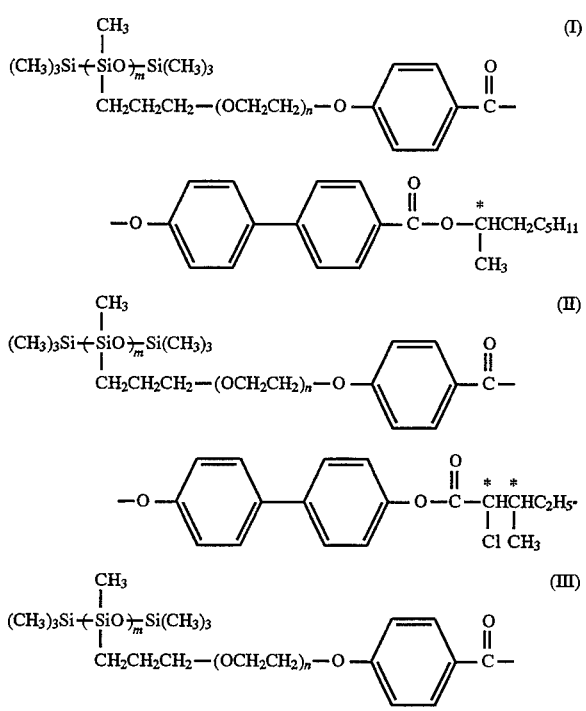
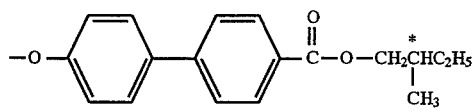

wherein m is an integer from 1 to 100, and n is an integer from 1 to 3.

2. The polymer of claim 1, wherein the polymer is of formula (I).

3. The polymer of claim 1, wherein the polymer is of formula (II).

4. The polymer of claim 1, wherein the polymer is of formula (III).

5. The polymer of claim 2, wherein m is between 20 and 80.

6. The polymer of claim 5, wherein m is between 40 and 80.

7. The polymer of claim 3, wherein m is between 20 and 80.

8. The polymer of claim 7, wherein m is between 40 and 80.

9. The polymer of claim 4, wherein m is between 20 and 80.

10. The polymer of claim 9, wherein m is between 40 and 80.

* * * * *